US009114416B2

(12) United States Patent
Byeon

(10) Patent No.: US 9,114,416 B2
(45) Date of Patent: Aug. 25, 2015

(54) NOZZLE OPENING/SHUTTING DEVICE FOR AIRLESS TYPE COSMETIC VESSEL

(71) Applicant: Jae Sam Byeon, Sejong-si (KR)

(72) Inventor: Jae Sam Byeon, Sejong-si (KR)

( * ) Notice: Subject to any disclaimer, the term of this patent is extended or adjusted under 35 U.S.C. 154(b) by 99 days.

(21) Appl. No.: 13/900,959

(22) Filed: May 23, 2013

(65) Prior Publication Data

US 2014/0346196 A1 Nov. 27, 2014

(51) Int. Cl.
*G01F 11/00* (2006.01)
*B05B 11/00* (2006.01)

(52) U.S. Cl.
CPC ......... *B05B 11/3052* (2013.01); *B05B 11/3036* (2013.01); *B05B 11/0067* (2013.01); *B05B 11/3021* (2013.01); *B05B 11/3025* (2013.01); *B05B 11/3097* (2013.01)

(58) Field of Classification Search
CPC ............ B05B 11/0072; B05B 11/3023; B05B 11/3053; B05B 11/3052; B05B 11/3036; B05B 11/3025; B05B 11/3021; B05B 11/3097; B05B 11/3067
USPC ........... 222/256, 257, 259, 321.1, 321.9, 340, 222/380, 383.1, 387, 321.3
See application file for complete search history.

(56) References Cited

U.S. PATENT DOCUMENTS

| | | | | |
|---|---|---|---|---|
| 8,245,884 | B2 * | 8/2012 | Byeon | 222/256 |
| 8,444,023 | B2 * | 5/2013 | Rossignol | 222/321.7 |
| 8,584,908 | B2 * | 11/2013 | Kakuta | 222/380 |
| 2005/0211798 | A1 * | 9/2005 | Garcia et al. | 239/333 |
| 2010/0224652 | A1 * | 9/2010 | Lim | 222/256 |

FOREIGN PATENT DOCUMENTS

| | | |
|---|---|---|
| KR | 10-0809870 | 3/2008 |
| KR | 10-1025191 | 4/2011 |

* cited by examiner

*Primary Examiner* — Frederick C Nicolas
*Assistant Examiner* — Bob Zadeh
(74) *Attorney, Agent, or Firm* — Jordan and Hamburg LLP

(57) ABSTRACT

A nozzle opening/shutting device of an airless type cosmetics vessel, in which a nozzle actuation button is installed between a nozzle housing and a stem, and a cam guide actuation unit is provided such that the cam guide actuation unit can guide a guide groove of a plunger upward and downward and can move the plunger forward and backward in a nozzle pipe by a cam operation, thereby opening and shutting the nozzle. This invention can move the plunger by a cam mechanism instead of a conventional spring mechanism, thereby preventing a misoperation and realizing a precise nozzle opening/shutting operation. The plunger is inserted in the nozzle such that a plunger end protrudes outside the nozzle and comes into close surface contact with the inlet of the nozzle, thereby preventing air introduction into the nozzle and preventing oxidation of the contents, and maintaining the quality of the contents constantly.

2 Claims, 8 Drawing Sheets

NOZZLE OPENING/SHUTTING DEVICE FOR AIRLESS TYPE COSMETIC VESSEL

BACKGROUND OF THE INVENTION

1. Field of the Invention

The present invention relates, in general, to a nozzle opening/shutting device of an airless type cosmetics vessel, which can discharge the contents of a vessel body in response to a button pushing and releasing action and, more particularly, to a nozzle opening/shutting device of an airless type cosmetics vessel, in which, when a user pushes and releases a push button, a plunger can move forward and backward by a cam mechanism so as to open and shut a cosmetic discharge hole of a nozzle, unlike in a conventional technique that uses a spring mechanism, and so the nozzle opening/shutting device of this invention can prevent a misoperation when opening and shutting the nozzle and can realize a precise nozzle opening/shutting operation, and in which an end of the plunger is inserted in the inlet of the cosmetic discharge hole of the nozzle in such a way that the plunger end protrudes outside the inlet and comes into close surface contact with the inlet, thereby preventing air from being introduced into the nozzle and preventing the contents of the cosmetics vessel from oxidizing, and maintaining the quality of the contents constantly.

2. Description of the Related Art

Generally, airless type cosmetics vessels are configured such that, when it is required to use a cosmetic product, the contents of the cosmetics vessel can be discharged by an operation of a pumping unit that is installed in an upper part of the vessel that contains liquid (gel) cosmetic therein, that is, the contents can be discharged by a pumping operation formed in response to a user's action of pushing and releasing an upper push button.

In related art, the airless type cosmetics vessels are classified into two types as follows.

In a first type of airless type cosmetics vessel, a cosmetic discharge hole moves downward along with a push button and the contents of the vessel can be discharged by a pumping operation of a pumping unit. In a second type of airless type cosmetics vessel, a push button moves downward in a state in which a cosmetic discharge hole is in a fixed position, and the contents of the vessel can be discharged by a pumping operation of a pumping unit.

Here, the present invention relates to the first type of airless type cosmetics vessel and, particularly, to a nozzle opening/shutting device of the vessel.

An example of related art techniques of the first type of airless type cosmetics vessel is referred to Korean Patent No. 10-0809870, entitled "pump push-down head" (hereinbelow, referred to simply as patent document 1).

The pump push-down head of the patent document 1 is operated as follows. When a cover part is pushed down, the pressure drag of a stem is larger than the pressure drag of a cover body relative to the stem, and so the stem is not moved downward, but the cover body is moved downward relative to a mounting sleeve member, and a lever member, the lower end of which is placed on the upper surface of a top plate of the mounting sleeve member, is rotated clockwise around a hinge shaft. Due to the rotation of the lever member, a valve member is moved backward while overcoming the elastic biasing force of a coil spring, thereby opening a discharge hole of a nozzle head. Thereafter, the stem is moved downward and the liquid contents flow from a pump and pass through a sleeve pipe by way of the stem, and so the liquid contents can be discharged to the outside from the discharge hole after passing through a passage from a connection hole.

When the pushing force is removed from the cover part, the nozzle head is shut by a process that is reversed from the above-mentioned process of opening the head.

Further, another example of the related art techniques is referred to Korean Patent No. 10-1025191, entitled "apparatus for opening and shutting nozzle of cosmetic case" (hereinbelow, referred to simply as patent document 2).

The apparatus of the patent document 2 includes: an actuation button body that is installed on the upper surface of a cosmetics vessel, and has a nozzle and a guide pipe that are provided so as to discharge the contents of the vessel to the outside, and has a support shaft and a spring holder that are installed in a rear part of the actuation button body; a rod-shaped nozzle opening/shutting pin that is inserted in the guide pipe of the actuation button body and moves forward and backward so as to open and shut the nozzle; a push pin that is integrated with the rear end of the nozzle opening/shutting pin and has a ring-shaped locking groove; a spring that is placed in back of the push pin and is inserted in the spring holder, and normally biases both the nozzle opening/shutting pin and the push pin forward; an actuation lever that is provided with a hinge shaft hole so as to be combined with the support shaft of the actuation button body, with an actuation member provided in a lower part of the actuation lever so as to be combined with the locking groove of the push pin; and a button cover that is installed in the upper part of the actuation button body and has a nozzle guide hole in the front surface thereof, and rotates the actuation lever in response to a pushing action of a user.

The apparatus of the patent document 2 is operated as follows. When a user pushes down the button cover of the actuation button body, the button cover is moved downward and presses the actuation lever, and so the actuation lever is rotated around the support shaft, and the push pin is moved backward while compressing the spring, thereby opening the nozzle. When the user further pushes the button cover, an airless pump performs a pumping operation and discharges the contents to the outside through the nozzle, thereby allowing the user to use the cosmetics. When the pushing force is removed from the button cover of the actuation button body, the airless pump is elastically returned to an upper position thereof and the push pin is moved forward by the spring, thereby closing the nozzle.

However, in the same manner as that of the technique of patent document 1, the technique disclosed in patent document 2 is problematic as follows. To open and shut the nozzle, the push pin is retracted backward while compressing the spring and advances forward by the elastic biasing force of the spring, and so, when the biasing force of the spring becomes weak or when the spring cannot perform a desired biasing operation (for example, because the contents in the nozzle become hardened), the push pin may not efficiently retract and may not efficiently advance.

In other words, the forward and backward movement of the push pin of the related art techniques may not realize a precise nozzle opening and shutting operation.

Further, in the same manner as that of the patent document 1, the technique disclosed in the patent document 2 is problematic in that the end of the push pin has a rounded shape, and the nozzle opening/shutting operation is performed in a state in which the rounded end of the push pin comes into linear contact with the interior of the cosmetic discharge hole of the nozzle, and so, when the contents remain in the cosmetic discharge hole of the nozzle and become hardened or when foreign substances become lodged in the cosmetic discharge hole, it may be almost impossible to completely shut the nozzle, and this may undesirably introduce air into the nozzle and may cause a change in quality of the contents, such as hardening or oxidizing of the contents, and may cause a leakage of the contents from the nozzle.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent No. 10-809870; and
(Patent Document 2) Korean Patent No. 10-1025191

SUMMARY OF THE INVENTION

Accordingly, the present invention has been made keeping in mind the above problems occurring in the related art, and the present invention is intended to propose a nozzle opening/shutting device of an airless type cosmetics vessel, in which, when a user pushes and releases a push button, a plunger can efficiently move forward and backward by a cam mechanism, unlike in a related art technique that uses a spring mechanism, and so the nozzle opening/shutting device of this invention can prevent a misoperation when opening and shutting the nozzle, unlike in the related art technique in which the plunger may not move forward or backward due to a change in quality of a spring, and which can realize a precise nozzle opening/shutting operation, thereby improving the operation reliability of products.

The present invention is further intended to configure the nozzle opening/shutting device in such a way that an end of the plunger is inserted in the inlet of a cosmetic discharge hole of the nozzle in such a way that the plunger end protrudes outside the inlet and comes into close surface contact with the inlet, thereby preventing air from being introduced into the nozzle and preventing the contents of the cosmetics vessel from oxidizing, and maintaining the quality of the contents constantly.

In order to achieve the above object, according to one aspect of the present invention, there is provided a nozzle opening/shutting device of an airless type cosmetics vessel, comprising: a cylinder installed inside an inner cap that is mounted to an upper end of a vessel body by a screw type mounting method; a pumping unit including: a disc valve, a piston support, a piston and a stem that are installed in the cylinder such that the stem can be elastically moved upward and downward by an elastic biasing spring; a nozzle housing having a lower connection pipe that is inserted in an upper end of the stem of the pumping unit; and an opening/shutting nozzle installed in a front assembly hole of the nozzle housing, the opening/shutting nozzle including: a nozzle pipe having guide pieces that are installed in an inner circumferential surface of a cosmetic discharge hole of the nozzle pipe at regular angular intervals; and a plunger that is inserted in the nozzle pipe and is guided forward and backward by the guide pieces so as to open and shut the cosmetic discharge hole, so that, when a push button that is provided on the nozzle housing is elastically pushed down, the opening/shutting nozzle is moved downward and the plunger is retracted so as to open the nozzle, and contents of the vessel body are discharged from the cosmetic discharge hole by a pumping and compressing operation of the pumping unit, wherein the nozzle opening/shutting device further comprises: a nozzle actuation button installed between the nozzle housing and the stem of the pumping unit such that the nozzle housing is elastically biased upward by first actuation springs that are placed on the nozzle actuation button; and a cam guide actuation unit provided on an upper surface of the nozzle actuation button such that, when the push button is pushed down, the cam guide actuation unit can guide a guide groove that is formed around a rear end of the plunger of the opening/shutting nozzle, upward and downward, and moves the plunger forward and backward in the nozzle pipe by a cam operation, thereby opening and shutting the nozzle.

In the present invention, the cam guide actuation unit may comprise left and right cam guide members that are shaped to be curved forward, with a cam guide slit formed between the left and right cam guide members, wherein the guide groove formed around the rear end of the plunger is inserted into the cam guide slit formed between the left and right cam guide members so that the guide groove can be guided upward and downward by the cam operation when the push button is pushed down.

Further, the plunger of the opening/shutting nozzle may have a protruding insert end that is formed by stepping a front end of the plunger in such a way that a diameter of the plunger is reduced at a location of the protruding insert end, wherein the plunger is inserted into the nozzle pipe such that the protruding insert end protrudes and an outer circumferential surface of the protruding insert end comes into close surface contact with the inner circumferential surface of the cosmetic discharge hole of the nozzle pipe.

The above-mentioned nozzle opening/shutting device of the airless type cosmetics vessel according to the present invention is advantageous in that the device can efficiently discharge the contents of the vessel body in response to a button pushing and releasing action, and in that, when a user pushes and releases the push button, the plunger moves forward and backward by the cam mechanism so as to open and shut the cosmetic discharge hole of the nozzle, unlike in a conventional technique that uses a spring mechanism, and so the nozzle opening/shutting device of this invention can prevent a misoperation when opening and shutting the nozzle and can realize a precise nozzle opening/shutting operation, and in that an end of the plunger is inserted in the inlet of the cosmetic discharge hole of the nozzle such that the plunger end protrudes outside the inlet and comes into close surface contact with the inlet, thereby preventing air from being introduced into the nozzle and preventing the contents from oxidizing, and maintaining the quality of the contents constantly.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
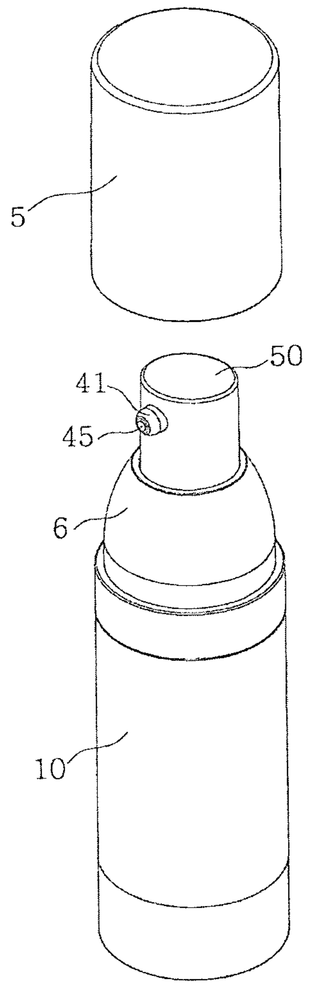
FIG. 1 is a perspective view illustrating the appearance of a cosmetics vessel according to the present invention.
Figure 2:
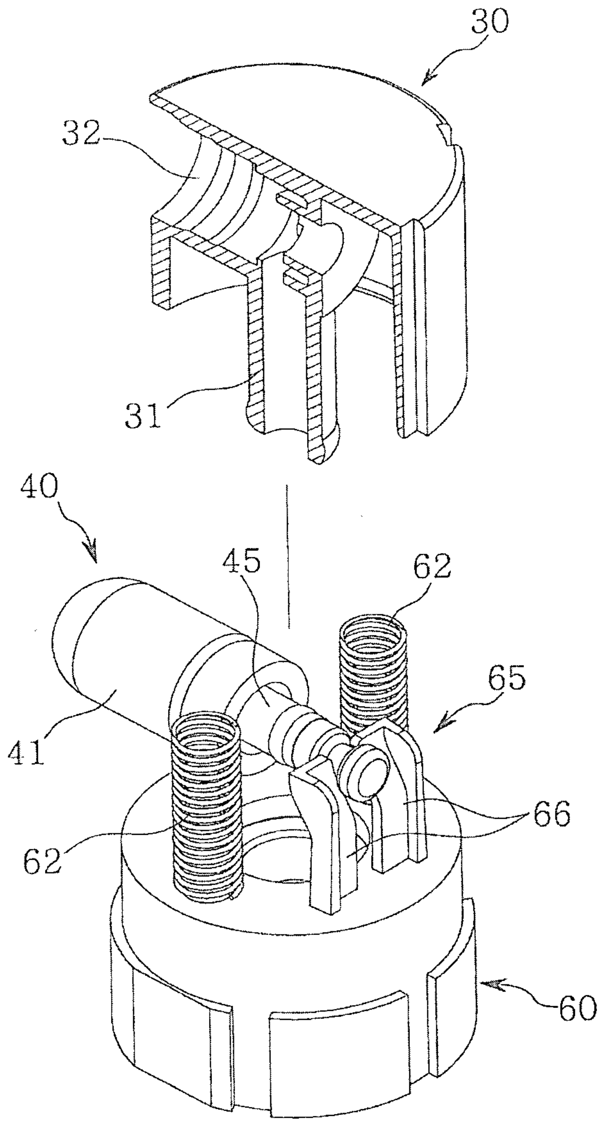
FIG. 2 is a perspective view of an important part of the cosmetics vessel according to the present invention.
Figure 3:
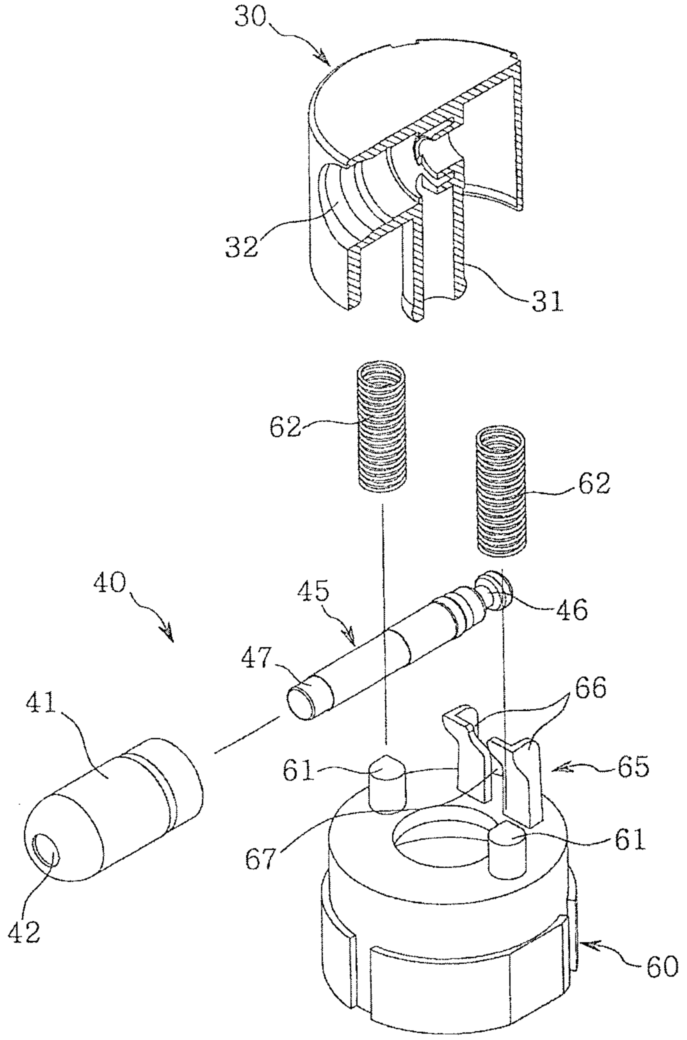
FIG. 3 is an exploded perspective view illustrating a part of FIG. 2.
Figure 4:
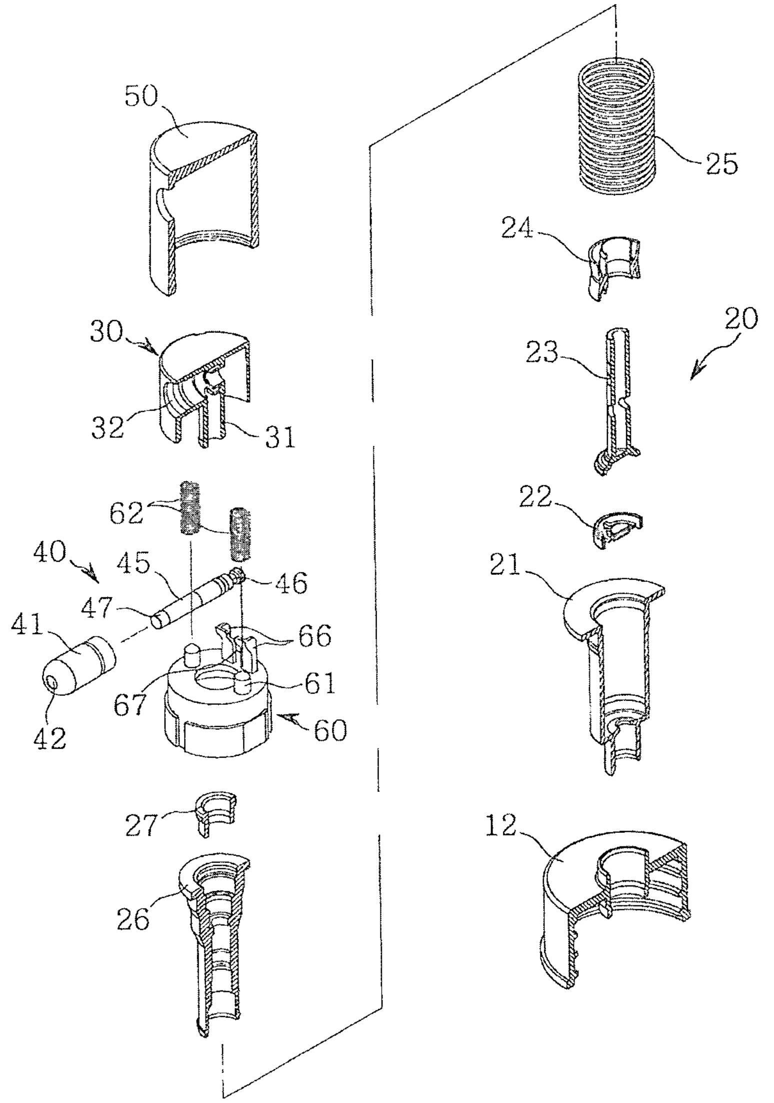
FIG. 4 is an exploded perspective view illustrating the whole of FIG. 2.
Figure 5:
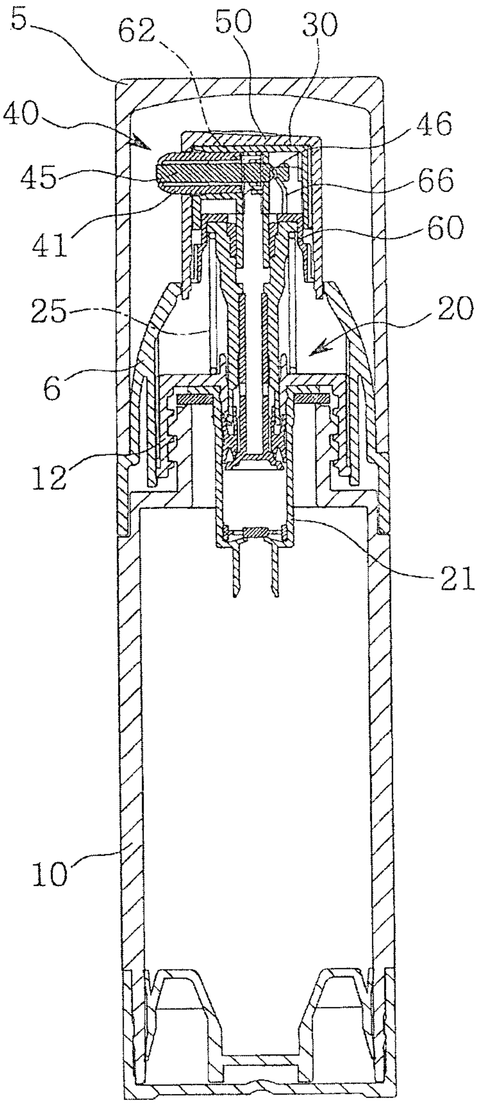
FIG. 5 is a sectional view of the cosmetics vessel according to the present invention.
Figure 6:
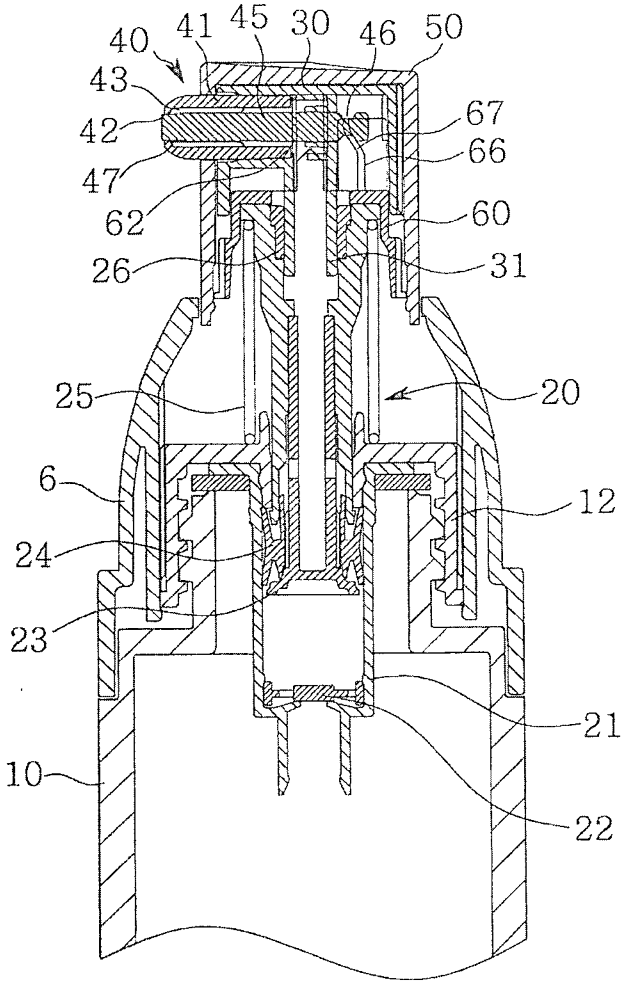
FIG. 6 is an enlarged view of a part of FIG. 5.

Hereinbelow, a preferred embodiment of the present invention will be described in detail with reference to the accompanying drawings.

As shown in FIG. 1 to FIG. 8, a nozzle opening/shutting device of an airless type cosmetics vessel according to the present invention includes: a cylinder 21 which is installed inside an inner cap 12 that is mounted to an upper end of a vessel body 10 by a screw type mounting method, and a pumping unit 20 that comprises a disc valve 22, a piston support 23, a piston 24 and a stem 26 which are inserted in the cylinder 21. Here, the stem 26 can be elastically moved upward and downward by an elastic biasing spring 25.

Further, a lower connection pipe 31 of a nozzle housing 30 is inserted in the upper end of the stem 26 of the pumping unit 20. An opening/shutting nozzle 40 is installed in a front assembly hole 32 of the nozzle housing 30. The opening/shutting nozzle 40 includes a nozzle pipe 41 that is provided with guide pieces 43 which are installed in the inner circumferential surface of a cosmetic discharge hole 42 of the nozzle pipe 41 at regular angular intervals. The opening/shutting nozzle 40 further includes a plunger 45 that is guided forward and backward by the guide pieces 43 installed inside the nozzle pipe 41 and opens and shuts the cosmetic discharge hole 42. Therefore, when a push button 50 that is provided on the nozzle housing 30 is elastically pushed down, the opening/shutting nozzle 40 is moved downward and the plunger 45 is retracted so as to open the nozzle 40. Therefore, the contents of the vessel body 10 can be discharged to the outside by a pumping and compressing operation of the pumping unit 20.

Further, a nozzle actuation button 60 is installed between the nozzle housing 30 and the stem 26 of the pumping unit 20 such that the nozzle housing 30 can be elastically biased upward by first actuation springs 62 that are placed on the nozzle actuation button 60.

A cam guide actuation unit 65 is provided at a location above the upper surface of the nozzle actuation button 60. Further, a guide groove 46 is formed around the rear end of the plunger 45 of the opening/shutting nozzle 40. When the push button 50 is pushed down, the guide groove 46 is guided upward and downward by the cam guide actuation unit 65, and moves the plunger 45 forward and backward in the nozzle pipe 41 by a cam operation of the cam guide actuation unit 65, thereby opening and shutting the nozzle 40.

The cam guide actuation unit 65 includes left and right cam guide members 66 that are shaped to be curved forward, with a cam guide slit 67 formed between the left and right cam guide members 66. The guide groove 46 that is formed around the rear end of the plunger 45 is inserted into the cam guide slit 67 between the left and right cam guide members 66 so that the guide groove 46 can be guided upward and downward by a cam operation when the push button 50 is pushed down.

Further, in the opening/shutting nozzle 40, a protruding insert end 47 is formed in the front end of the plunger 45. Here, to form the protruding insert end 47, the plunger 45 is stepped in such a way that the diameter of the plunger 45 is reduced at a location of the protruding insert end 47. The plunger 45 is inserted into the nozzle pipe 41 such that the outer circumferential surface of the protruding insert end 47 comes into close surface contact with the inner circumferential surface of the cosmetic discharge hole 42 of the nozzle pipe 41.

In the drawings, reference numeral 5 denotes a cap of the cosmetics vessel, 6 denotes a shoulder that is combined with the upper part of the vessel body 10, 27 denotes a stem valve, and 61 denotes spring holders that are formed as protrusions on the upper surface of the nozzle actuation button 60 so as to hold the respective first actuation springs 62.

Hereinbelow, the operation and function of the present invention will, be described.

First, when the nozzle housing 30 that is assembled with the opening/shutting nozzle 40 is pushed down by the upper push button 50, the nozzle housing 30 is moved downward together with the opening/shutting nozzle 40 while elastically compressing the first actuation springs 62 that are placed on the upper surface of the nozzle actuation button 60.

In the above state, the guide groove 46 that is formed around the rear end of the plunger 45 of the opening/shutting nozzle 40 is moved downward in a state in which the guide groove 46 is guided by the cam guide slit 67 that is formed between the left and right cam guide members 66 of the cam guide actuation unit 65.

Here, because the left and right cam guide members 66 are shaped to be curved forward, the guide groove 46 that is formed around the rear end of the plunger 45 is moved downward under the guide of the cam operation of the cam guide slit 67, and so the plunger 45 can be moved backward.

Figure 7:
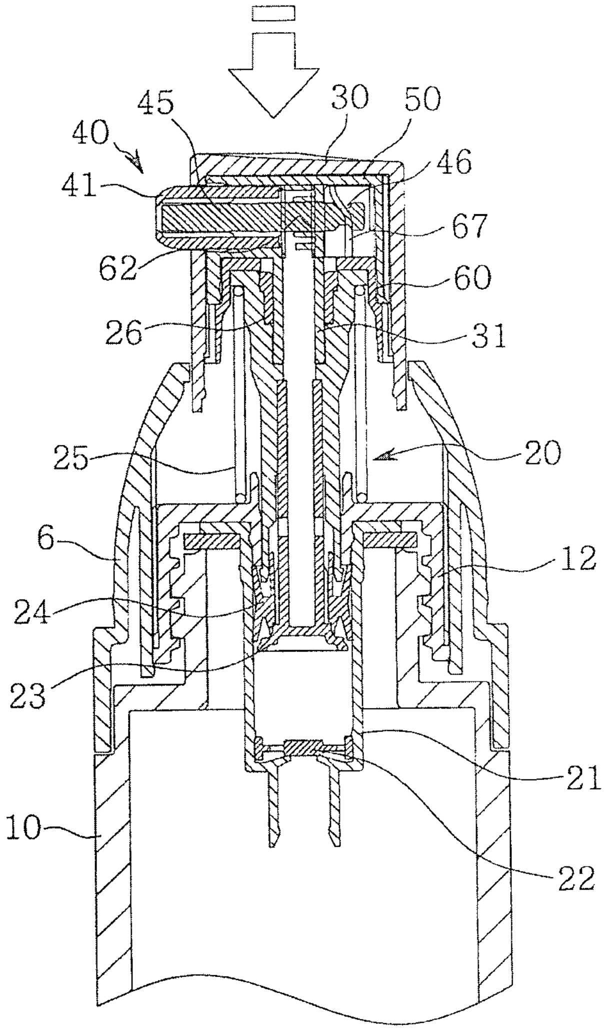
FIGS. 7 and 8 are sectional views illustrating the operation of the cosmetics vessel according to the present invention.
Figure 8:
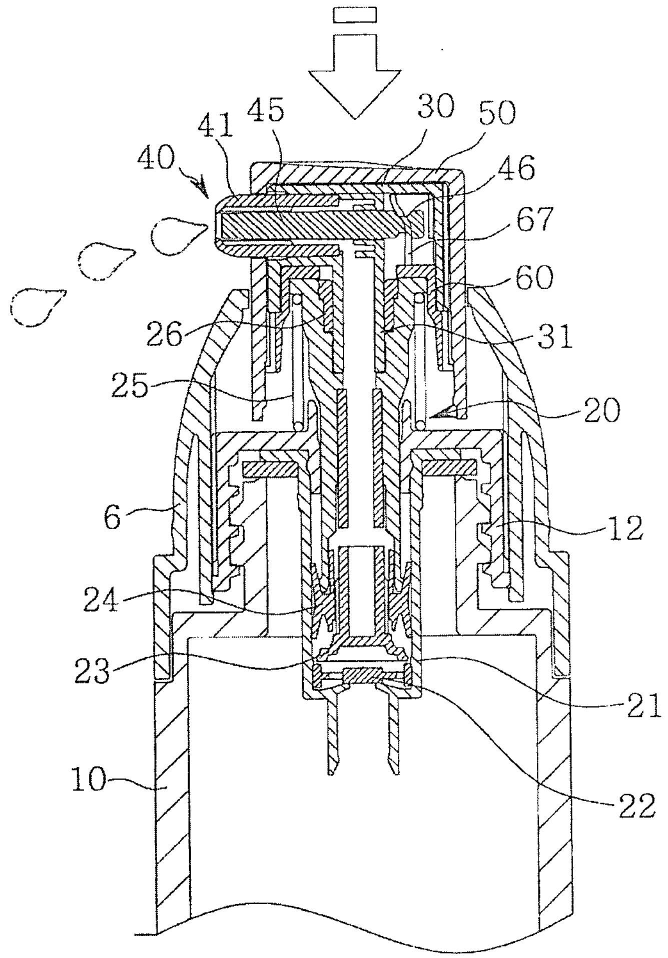

When the plunger 45 is moved backward as described above, the protruding insert end 47 that is formed by the front end of the plunger 45 is retracted backward in the cosmetic discharge hole 42 of the nozzle pipe 41, and opens the cosmetic discharge hole 42 (see FIG. 7).

When the push button 50 is further moved downward in the above state, the pumping unit 20 is moved downward together with both the nozzle housing 30 and the nozzle actuation button 60 while compressing the biasing spring 25, and so the contents that are contained in the vessel body 10 of the cosmetics vessel are discharged to the outside from the cosmetic discharge hole 42, after being sequentially passed through the pumping unit 20, the nozzle housing 30 and the nozzle pipe 41 by the pumping and compressing operation of the pumping unit 20.

When the pushing force is removed from the push button 50 after discharging the contents of the cosmetics vessel, the nozzle housing 30, the nozzle actuation button 60 and the pumping unit 20 are moved upward by the biasing force of the elastic biasing spring 25, thereby being returned to respective original positions.

Further, the nozzle housing 30 that is placed on the nozzle actuation button 60 is elastically returned to an original position by a biasing force of the first actuation springs 62.

In the above state, the guide groove 46 that is formed by being stepped around the rear end of the plunger 45 of the opening/shutting nozzle 40 is moved upward to be returned to an original position under the guide of the cam guide slit 67 that is formed between the left and right cam guide members 66 of the cam guide actuation unit 65.

In other words, when the guide groove 46 of the plunger 45 is moved upward under the guide of the cam guide slit 67, the plunger 45 is moved forward by the cam operation of the cam guide slit 67 and shuts the nozzle pipe 41.

Further, in the above state, the plunger 45 of the opening/shutting nozzle 40 is moved forward under the guide of the guide pieces 43 that are installed in the inner circumferential surface of the nozzle pipe 41 at regular angular intervals, and the protruding insert end 47 that is formed by stepping the front end of the plunger 45 so as to reduce the diameter of the plunger 45 is inserted into the cosmetic discharge hole 42 of the nozzle pipe 41 and protrudes forward from the cosmetic discharge hole 42, thereby being returned to an original position.

Here, the protruding insert end 47 that is formed in the front end of the plunger 45 comes into close surface contact with the inner circumferential surface of the cosmetic discharge hole 42 of the nozzle pipe 41, and so air cannot flow into the nozzle 40 and the contents of the cosmetics vessel can be prevented from oxidizing, and the desired quality of the contents can be maintained constantly.

Accordingly, the nozzle opening/shutting device of the airless type cosmetics vessel according to the present invention is advantageous in that, when a user pushes and releases the push button, the plunger moves forward and backward by a cam mechanism so as to open and shut the cosmetic discharge hole of the nozzle, unlike in a conventional technique that uses a spring mechanism, and so the nozzle opening/shutting device of this invention can prevent a misoperation when opening and shutting the nozzle and can realize a precise nozzle opening/shutting operation, and in that the end of the plunger is inserted in the inlet of the cosmetic discharge hole of the nozzle such that the plunger end protrudes outside the inlet and comes into close surface contact with the inlet, thereby preventing air from being introduced into the nozzle and preventing the contents from oxidizing, and maintaining the quality of the contents constantly.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A nozzle opening/shutting device of an airless type cosmetics vessel, comprising:

a cylinder installed inside an inner cap that is mounted to an upper end of a vessel body by a screw type mounting method;

a pumping unit including: a disc valve, a piston support, a piston and a stem that are installed in the cylinder such that the stem can be elastically moved upward and downward by an elastic biasing spring;

a nozzle housing having a lower connection pipe that is inserted in an upper end of the stem of the pumping unit; and an opening/shutting nozzle installed in a front assembly hole of the nozzle housing, the opening/shutting nozzle including:

a nozzle pipe having guide pieces that are installed in an inner circumferential surface of a cosmetic discharge hole of the nozzle pipe at regular angular intervals; and a plunger that is inserted in the nozzle pipe and is guided forward and backward by the guide pieces so as to open and shut the cosmetic discharge hole, so that, when a push button that is provided on the nozzle housing is elastically pushed down, the opening/shutting nozzle is moved downward and the plunger is retracted so as to open the nozzle, and contents of the vessel body are discharged from the cosmetic discharge hole by a pumping and compressing operation of the pumping unit; and wherein the nozzle opening/shutting device further comprises:

a nozzle actuation button installed between the nozzle housing and the stem of the pumping unit such that the nozzle housing is elastically biased upward by first actuation springs that are placed on the nozzle actuation button; and a cam guide actuation unit provided on an upper surface of the nozzle actuation button such that, when the push button is pushed down, the cam guide actuation unit can guide a guide groove that is formed around a rear end of the plunger of the opening/shutting nozzle, upward and downward, and moves the plunger forward and backward in the nozzle pipe by a cam operation, thereby opening and shutting the nozzle;

wherein the cam guide actuation unit comprises left and right cam guide members that are shaped to be curved forward, with a cam guide slit formed between the left and right cam guide members; and wherein the guide groove formed around the rear end of the plunger is inserted into the cam guide slit formed between the left and right cam guide members so that the guide groove can be guided upward and downward by the cam operation when the push button is pushed down.

2. The nozzle opening/shutting device of the airless type cosmetics vessel as set forth in claim 1, wherein the plunger of the opening/shutting nozzle has a protruding insert end that is formed by stepping a front end of the plunger in such a way that a diameter of the plunger is reduced at a location of the protruding insert end; and wherein the plunger is inserted into the nozzle pipe such that the protruding insert end protrudes and an outer circumferential surface of the protruding insert end comes into close surface contact with the inner circumferential surface of the cosmetic discharge hole of the nozzle pipe.

* * * * *